US008595208B2

(12) United States Patent  
Jing et al.

(10) Patent No.: US 8,595,208 B2
(45) Date of Patent: Nov. 26, 2013

(54) HOVER TRANSLATION OF SEARCH RESULT CAPTIONS (75) Inventors: Kun Jing, Beijing (CN); Matthew Robert Scott, Beijing (CN); Kaihua Yin, Beijing (CN); Ye Xu, Beijing (CN); Yaping Liu, Beijing (CN); Quan Tang, Beijing (CN); Hao Wei, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/355,195

(22) Filed: Jan. 20, 2012

(65) Prior Publication Data

US 2012/0323878 A1    Dec. 20, 2012

(51) Int. Cl.
 *G06F 17/30* (2006.01)
(52) U.S. Cl.
 USPC .............................. 707/707; 707/709; 707/803
(58) Field of Classification Search
 USPC ......................................... 707/707, 756, 803
 See application file for complete search history.

(56) References Cited

U.S. PATENT DOCUMENTS

| 8,250,083 B2 * | 8/2012 | Bennett ........................ 707/756 |
| 2005/0197826 A1 | 9/2005 | Neeman |
| 2006/0173829 A1 | 8/2006 | Neeman et al. |
| 2006/0277189 A1 * | 12/2006 | Cencini ............................ 707/10 |
| 2008/0281578 A1 | 11/2008 | Kumaran et al. |
| 2009/0281790 A1 | 11/2009 | Travieso et al. |
| 2010/0174525 A1 | 7/2010 | Travieso et al. |
| 2011/0320468 A1 * | 12/2011 | Child ............................ 707/756 |

OTHER PUBLICATIONS

"Google Translate Help", Retrieved on: Jan. 6, 2011 Available at: http://translate.google.com/support/?hl=en.
"Hover over a word & get an instant translation with Google Toolbar", Retrieved on: Jan. 6, 2011 Available at: http://forum.thewindowsclub.com/downloads-windows/30723-hover-over-word-get-instant-translation-google-toolbar.html.

* cited by examiner

*Primary Examiner* — Debbie Le
(74) *Attorney, Agent, or Firm* — Shook, Hardy & Bacon L.L.P.

(57) ABSTRACT

Systems, methods, and computer-readable media for presenting video as at least a portion of the background of search engine home pages are provided. Upon receiving a request for presentation of a search engine home page, a static image is transmitted for presentation as at least a portion of the background for the search engine home page. Also transmitted is a streaming video file. The static image may or may not be associated with the streaming video file. After a predetermined amount of time, play of the streaming video file is initiated without user action, the streaming video file replacing the static image as at least a portion of the background of the search engine home page. In this way, the user receives a seamless transition from a static image to a video presentation and is provided a rich, immersive experience at the search engine home page.

20 Claims, 9 Drawing Sheets

| SEATTLE | 🔍 |
|---|---|

网页 | 图片

相关搜索
SEATTLEWEATHER
SLEEPLESS IN SEATTLE
SEATTLETIMES
SEATTLEPREMIUM OUTLET
SEATTLEUNIVERSITY
HELLO SEATTLE
AJA SEATTLE
MITBBS SEATTLE

语言
中文
英语

SEARCH TOOLS
TURN OFF HOVER
TRANSLATION

ENGLISH RESULTS            1 – 10条结果( 共5,430,000条)

VISITING SEATTLE, THE OFFICIAL SITE OF THE CITY OF SEATTLE
SEATTLEWELCOMES VISITORS FROM ALL OVER THE WORLD. MANY OF THE LINKS IN THE VISITOR SECTION OF OUR SITE ARE OUTSIDE LINKS. PLEASE SAVE THIS SITE IN YOUR FAVORITES OR BOOKMARKS SO IT....
WWW.SEATTLE.GOV/HTML/VISITOR – CACHED PAGE – MARK AS SPAM

SEATTLE.GOV – THE OFFICIAL SITE OF THE CITY OF SEATTLE- HOME PAGE
HOME PAGE OF THE OFFICIAL WEB SITE OF THE CITY OF SEATTLE-- SEATTLEPUBLIC ACCESS NETWORK
WWW.SEATTLE.GOV – CACHED PAGE – MARK AS SPAM

SEATTLE- WIKIPEDIA, THE FREE ENCYCLOPEDIA
HISTORY – GEOGRAPHY – CITYSCAPE -CULTURE
SEATTLEIS THE NORTHERNMOST MAJOR CITY IN THE CONTIGUOUS UNITED STATES, AND THE LARGEST CITY IN THE PACIFIC NORTHWEST AND IN THE STATE OF WASHINGTON. A SEAPORT SITUATED ON AN...
WWW.SEATTLE.GOV – CACHED PAGE – MARK AS SPAM

THE SEATTLETIMES | SEATTLETIMES NEWSPAPER
DAILY LOCAL NEWS, SPORTS, ARTS AND ENTERTAINMENT, CLASSIFIED ADDS.
SEATTLETIMES.NWSOURCE.COM/HTML/HOME – CACHED PAGE – MARK AS SPAM

SEATTLEYELLOW PAGES – YP.COM
SEATTLEQUICK GUIDE. SEATTLEIS HOME TO A GOOD NUMBER OF CORPORATE SUCCESS STORIES, INCLUDING OUTDOOR OUTFITTERS EDDIE BAUER AND REI, STARBUCKS AND A...
YP.COM/SEATTLE-WA-YELLOWPAGES – CACHED PAGE – MARK AS SPAM

| SEATTLE | 🔍 |

网页 | 图片

相关搜索　　　　　　ENGLISH RESULTS　　　　　　　　　　　　　　　　　　　1 – 10条结果 (共5,430,000条)
SEATTLEWEATHER
SLEEPLESS IN SEATTLE　　VISITING SEATTLE, THE OFFICIAL SITE OF THE CITY OF SEATTLE
SEATTLETIMES　　　　　　SEATTLE WELCOMES VISITORS FROM ALL OVER THE WORLD. MANY OF THE LINKS IN THE
SEATTLE PREMIUM OUTLET　VISITOR SECTION OF OUR SITE ARE OUTSIDE LINKS. PLEASE SAVE THIS SITE IN YOUR
SEATTLEUNIVERSITY　　　 FAVORITES OR BOOKMARKS SO IT...
HELLO SEATTLE　　　　　 WWW.SEATTLE.GOV/HTML/VISITOR – CACHED PAGE – MARK AS SPAM
AIA SEATTLE
MITBBS SEATTLE　　　　　SEATTLE.GOV – THE OFFICIAL SITE OF THE CITY OF SEATTLE- HOME PAGE
　　　　　　　　　　　　　HOME PAGE OF THE OFFICIAL WEB SITE OF THE CITY OF SEATTLE-- SEATTLEPUBLIC ACCESS
语言　　　　　　　　　　　NETWORK
中文　　　　　　　　　　　WWW.SEATTLE.GOV – CACHED PAGE – MARK AS SPAM
英语
　　　　　　　　　　　　　SEATTLE- WIKIPEDIA, THE FREE ENCYCLOPEDIA
SEARCH TOOLS　　　　　　HISTORY – GEOGRAPHY – CITYSCAPE -CULTURE
TURN OFF HOVER　　　　　SEATTLE IS THE NORTHERNMOST MAJOR CITY IN THE CONTIGUOUS UNITED STATES, AND THE
TRANSLATION　　　　　　 LARGEST CITY IN THE PACIFIC NORTHWEST AND IN THE STATE OF WASHINGTON. A SEAPORT
　　　　　　　　　　　　　SITUATED ON AN...
　　　　　　　　　　　　　WWW.SEATTLE.GOV – CACHED  ┌──────────────────────────────────────┐
　　　　　　　　　　　　　                             │ OUTFITTER [aʊtˈfɪtə(r)]        510  │
　　　　　　　　　　　　　THE SEATTLETIMES | SEA      │ N.                                   │
　　　　　　　　　　　　　DAILY LOCAL NEWS, SPORTS,   │ 1. 服饰用品商店；旅行用品商店；      │
　　　　　　　　　　　　　SEATTLETMES.NWSOURCE.CO     │    运动用品店，安装机器的机工        │
　　　　　　　　　　　　　                             │ MORE TRANSLATIONS TURN OFF HOVER     │
　　　　　　　　　　　　　SEATTLEYELLOW PAGES         │ TRANSLATION                          │
　　　　　　　　　　　　　SEATTLEQUICK GUIDE. SEATTLE └──────────────────────────────────────┘ESS
　　　　　　　　　　　　　STORIES, INCLUDING OUTDOOR OUTFITTERS EDDIE BAUER AND REI, STARBUCKS AND A...
　　　　　　　　　　　　　YP.COM/SEATTLE-WA-YELLOWPAGES – CACHED PAGE – MARK AS SPAM

SEATTLE 🔍

网页 图片

相关搜索
SEATTLEWEATHER
SLEEPLESS IN SEATTLE
SEATTLETIMES
SEATTLEPREMIUM OUTLET
SEATTLEUNIVERSITY
HELLO SEATTLE
AIA SEATTLE
MITBBS SEATTLE

语言
中文
英语

SEARCH TOOLS
TURN OFF HOVER TRANSLATION

ENGLISH RESULTS                                                    1 – 10条结果 ( 共5,430,000 条)

VISITING SEATTLE, THE OFFICIAL SITE OF THE CITY OF SEATTLE
SEATTLEWELCOMES VISITORS FROM ALL OVER THE WORLD. MANY OF THE LINKS IN THE VISITOR SECTION OF OUR SITE ARE OUTSIDE LINKS. PLEASE SAVE THIS SITE IN YOUR FAVORITES OR BOOKMARKS SO IT...
WWW.SEATTLE.GOV/HTML/VISITOR – CACHED PAGE – MARK AS SPAM

SEATTLE.GOV – THE OFFICIAL SITE OF THE CITY OF SEATTLE- HOME PAGE
HOME PAGE OF THE OFFICIAL WEB SITE OF THE CITY OF SEATTLE-- SEATTLEPUBLIC ACCESS NETWORK
WWW.SEATTLE.GOV – CACHED PAGE – MARK AS SPAM

SEATTLE- WIKIPEDIA, THE FREE ENCYCLOPEDIA
HISTORY – GEOGRAPHY – CITYSCAPE -CULTURE
SEATTLEIS THE NORTHERNMOST MAJOR CITY IN THE CONTIGUOUS UNITED STATES, AND THE LARGEST CITY IN THE PACIFIC NORTHWEST AND IN THE STATE OF WASHINGTON. A SEAPORT SITUATED ON AN...
WWW.SEATTLE.GOV – CACHED PAGE – MARK AS SPAM

THE SEATTLET  ┌─ 610
DAILY LOCAL NEW │ DAILY LOCAL NEWS, SPORTS, ARTS AND ENTERTAINMENT,
SEATTLETMES.NW│ CLASSIFIED ADS.
                │ 体育、艺术和娱乐、本地新闻分类广告。
SEATTLEYELLO│
SEATTLEQUICK GU│ 再次解释   关闭屏幕取词
STORIES, INCLUDING OUTDOOR OUTFITTERS EDDIE BAUER AND REI, STARBUCKS AND A...
YP.COM/SEATTLE-WA-YELLOWPAGES – CACHED PAGE – MARK AS SPAM

HOVER TRANSLATION OF SEARCH RESULT CAPTIONS

CROSS-REFERENCE TO RELATED APPLICATIONS

This application claims priority to International Patent Application No. PCT/CN2011/075936, filed Jun. 20, 2011 and entitled "Hover Translation of Search Result Captions," which application is hereby incorporated by reference as if set forth in its entirety herein.

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is that provided by Microsoft Network (MSN™). In response to a user's search query, an Internet search engine generally provides search results that list various Web pages that are determined to most closely satisfy the input query. These search results often include captions associated with the Web pages that describe the pages or show a portion of the pages' content.

Often a user's search yields results that include various Web pages composed in foreign languages. For example, a search input into a Chinese language version of a search engine may return Web pages and, accordingly, Web page descriptions or captions, in English. If the user is unable to read this language or has limited knowledge thereof, the English results are incomprehensible or confusing to the user and may be disregarded. As such, the user may ignore highly relevant documents because of an inability to comprehend information associated with the foreign language results, or may need to engage an online translation service or client software to look up an explanation of the unclear text. This can be a time consuming and complex process as the user must switch back and forth between the search results page and the translation service, not to mention the user has to install and open the translation service or client software in the beginning. This slows down the user's reading speed on the search results page.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things, enabling hover translation of selected search engine result captions or portions thereof. Users request to see a translation of one or more words presented in association with a search engine result caption using a mouse action (e.g., a hover action), a key combination, a touch on the screen, or any other activation method, the one or more words being presented in a first natural language. Upon receiving the request, a translation of the appropriate word(s) is presented in a float panel or window proximate to the selected caption portion in a second natural language that differs from the first. As the translations are presented quickly and without disrupting the search engine results page itself, users are able to understand the search engine result caption much more quickly than with existing translation systems. As a result, the user obtains a better idea of what information is available from various links, even when linked and described in a foreign language, without having to separately engage online translation services or client translation software. In this way, users are able to understand the information available from particular search result captions more quickly.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, enabling hover translation of selected search engine result captions or portions thereof. Users request to see a translation of one or more words presented in association with a search engine result caption using a mouse action (e.g., a hover action), a key combination, a touch on the screen, or any other activation method, the one or more words being presented in a first natural language. Upon receiving the request, a translation of the appropriate word(s) is presented in a float panel or window proximate to the selected caption portion in a second natural language that differs from the first. As the translations are presented quickly and without disrupting the search engine results page itself, users are able to understand the search engine result caption much more quickly than with existing translation systems. As a result, the user obtains a better idea of what information is available from various links, even when linked and described in a foreign language, without having to separately engage online translation services or client translation software.

Accordingly, one embodiment of the present invention is directed to one or more computer-readable storage media storing computer-useable instructions that, when used by one or more computing devices, cause the one or more computing devices to perform a method for enabling hover translation of a portion of a search engine results page (SERP). The method comprises receiving a search query input by a user, the search query being received via a browser, and dynamically attaching instructions (e.g., via an additional JavaScript) to a plurality of search results determined to satisfy the query. The instructions cause the browser to render the SERP having a plurality of search result captions, each search result caption including a plurality of text elements. At least a portion of the text elements include an event (e.g., an onmouseover event) appended thereto, the event being triggered by a particular user action (e.g., a user hover action). The instructions further cause the browser to detect the particular user action with respect to one of the plurality of text elements and, in response to detecting the particular user action, request a translation of text associated with the one of the plurality of text elements. Still further, the instructions cause the browser to receive a translation of the text associated with the one of the plurality of text elements and present the translation in a floating panel proximate to the text associated with the one of the plurality of text elements. The instructions (e.g., JavaScript) are initialized immediately when the SERP is rendered in the user's browser.

Another embodiment of the present invention is directed to a hover-translation system for search engine results pages. The system comprises a computing device associated with one or more processors and one or more computer-readable storage media, a data store coupled with the computing device, and a search engine. The search engine is configured to receive a query input by a user, the search query being received via a browser, determine an HTML response containing search results satisfying the search query, and attach instructions (e.g., via an additional JavaScript) to the HTML response. The instructions cause the browser to render a SERP having a plurality of search result captions, each search result caption having a plurality of text elements. At least a portion of the text elements include an event (e.g., an onmouseover event) appended thereto, the event being triggered by a particular user action (e.g., a user hover action). The instructions further cause the browser to detect the particular user action with respect to one of the plurality of text elements and, in response to detecting the particular user action, request a translation of text associated with the one of the plurality of text elements. Still further, the instructions cause the browser to receive a translation of the text associated with the one of the plurality of text elements and present the translation in a floating panel proximate to the text associated with the one of the plurality of text elements. The instructions (e.g., JavaScript) are initialized immediately when the SERP is rendered in the user's browser.

In yet another embodiment, the present invention is directed to one or more computer-readable storage media storing computer-useable instructions that, when used by one or more computing devices, cause the one or more computing devices to perform a method for enabling hover translation of a portion of a search engine results page (SERP). The method comprises receiving a search query input by a user and attaching instructions (e.g., via an additional JavaScript) to a plurality of search results determined to satisfy the query. Immediately upon rendering the SERP in the user's browser, the instructions (e.g., JavaScript) are initialized. The instructions cause the browser to render the SERP with at least one search result caption, the at least one search result caption having a document object model (DOM) tree associated therewith, the DOM tree having a plurality of text nodes, each node being associated with an element of the search result caption, such as a word, paragraph, table cell, and so forth.

As the instructions are running, the DOM tree of the SERP is scanned. Every time a text node is discovered, the instructions cause the browser to create a respective first element associated with that text node and create a respective second element associated with each text node. Each second element includes an event (e.g., an onmouseover event) appended thereto, the event being triggered by a particular user action (e.g., a user hover action). For each text node, the instructions cause the browser to replace the respective first element with the respective second element. Still further, the instructions cause the browser to detect the particular user action with respect to one of the second elements. That is, the user selects one of the second elements—a word or a sequence of words represented by a node of the DOM tree—by clicking a mouse button while a mouse pointer is proximate to the word or sequence of words, merely by momentarily placing the mouse pointer proximate to the word or sequence of words (e.g., "hovering"), or via some other user action. In response to detecting the particular user action, the instructions cause the browser to request a translation of text associated with the one of the second elements. The instructions cause the browser to receive a translation of the text associated with the one of the second elements and once the translation is received, execute a callback function. The callback function creates a float panel proximate to the text associated with the one of the plurality of text elements, the float panel having the translation presented therein.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
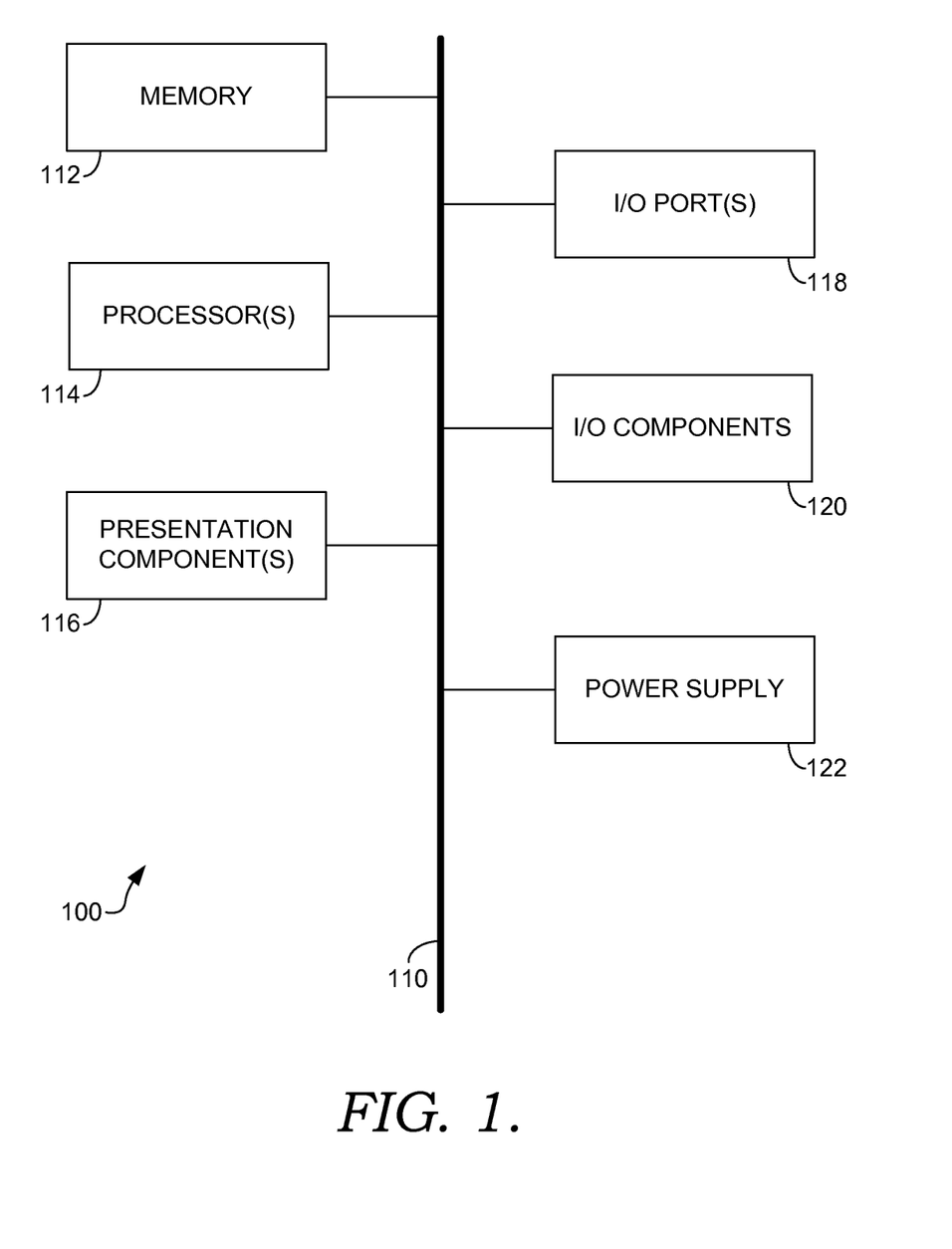
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, the current invention relates to systems, methods, and computer-readable media for enabling hover translation of selected search engine result captions or portions thereof so that users do not have to separately engage online translation services or client translation software to quickly get translations that they desire. Generally, the search engine result captions are derived or otherwise extracted from an electronic document to which a search engine result caption pertains. As will be appreciated by those skilled in the art, electronic documents may be any set of content stored on computer-readable media. For example, computer items/files such as word processor documents, spreadsheets, or Web pages may be considered electronic documents. Further, any set of text or binary data may be considered an electronic document. The electronic documents may be stored in a single database/data store (e.g., data repository 216 of FIG. 2, more fully described below) or in multiple locations.

Figure 2:
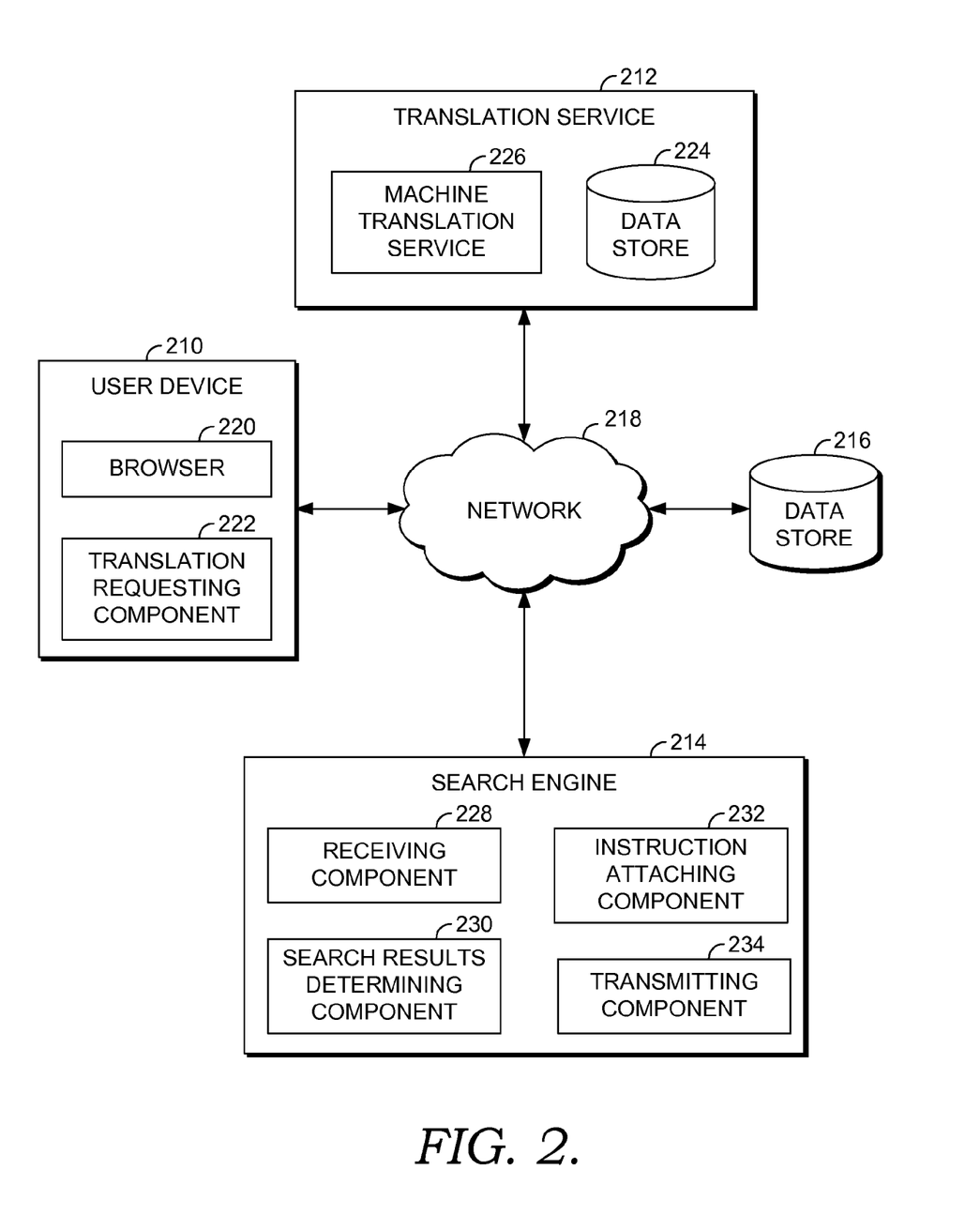
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which text comprising search engine result captions and/or portions thereof may be translated and the translations presented in a floating panel or window proximate the original text. As will be described in further detail below, embodiments of the present invention provide translation of selected search engine result captions or portions thereof so that users do not have to separately engage online translation services or client translation software to quickly get translations that they desire. As a result, the user obtains a better idea of what information is available from various links, even when linked and described in a foreign language, without having to separately engage online translation services or client translation software.

Among other components not shown, the computing system 200 generally includes a user computing device 210, a translation service 212, a search engine 214, and a data repository 216, all in communication with one another via a network 218. The network 218 may include, without limitation, one or more local area networks (LANs) and/or wide area networks (WANs). Such networking environments are commonplace in offices, enterprise-wide computer networks, intranets and the Internet. Accordingly, the network 218 is not further described herein.

It should be understood that any number of user computing devices, translation services and search engines may be employed in the computing system 200 within the scope of embodiments of the present invention. Each may comprise a single device/interface or multiple devices/interfaces cooperating in a distributed environment. For instance, the search engine 214 may comprise multiple devices and/or modules arranged in a distributed environment that collectively provide the functionality of the search engine 214 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the user computing device 210, as an Internet-based service, or as a module inside the search engine 214. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or user computing devices. By way of example only, the translation service 212 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as computing device 100 described with reference to FIG. 1, for example. As illustrated, the user computing device 210 includes a browser 220. The browser 220 is configured to render the results of input search queries in association with a display screen (not shown) of the user computing device 210. While search results are described as being provided and presented, it is straightforward for the computing system 200 to provide a link or other reference by which the user may retrieve the relevant result(s). Note that the link need not be followed by a conventional browser; for example, an application residing on or accessed by the user computing device 210 can follow the link, obtain the search result(s), and insert a representation of the search result(s) into its output. Further, the functionality described herein as being performed by the browser may be performed by any other application capable of rendering web content. Any and all such variations, and any combination thereof, are contemplated to be within the scope of embodiments of the present invention.

The browser 220 includes a translation requesting component 222 that is configured to transmit a request for translation of a search result caption or portion thereof when the browser detects a particular user action with respect thereto. Such user actions may include, by way of example only, hovering, clicking, or double-clicking a mouse over the visible portion, touching it with an electronic pen, touching it with a finger using a touch-sensitive display screen, using vocal commands (voice activated), pointing to it using a joystick, or the like. The translation requesting component 222 is configured to transmit such request to a translation service, for instance, translation service 212. The translation service 212 is more fully described below.

The browser 220 is further configured to receive a translation of the text associated with a search result caption (or portion thereof) for which translation was requested and to present the translation in a window or floating panel proximate to the text associated with such search result caption/portion. It will be understood and appreciated by those of ordinary skill in the art that the translated text may be presented in any number of ways, such presentation not being limited to a window or floating panel. For instance, the translated text may be presented in association with the same Web page as the text for which translation was requested. Additionally, the location of presentation of the translated text is not meant to limit the scope of embodiments hereof in any way. Rather, the text may be presented in any number of locations including, by way of example only, a dedicated panel or region of the search engine results page. Any and all such variations and any combination thereof are contemplated to be within the scope of embodiments of the present invention.

In embodiments, upon receiving a translation of text associated with a search result caption/portion, the browser 220 is configured to execute a callback function. The callback function creates a window or floating panel for presenting the received translation. In embodiments, the translation is at least partially in a natural language that is different from the natural language in which the selected search result caption/portion was rendered. The natural language of the translated text may be the natural language, e.g., that a search engine interface through which the search query was received is rendered, and/or may be in a natural language specified by a user-language-preference setting. Any and all such variations, and any combination thereof, are contemplated to be within the scope of embodiments of the present invention.

The translation service 212 may take the form of a dedicated device for performing the functions described below; may be integrated into, e.g., the user computing device 210, a network access device (not shown), the search engine 214, or the like; or any combination thereof. The translation service 212 may be hosted by one or more server computing devices (not shown) and may include a data repository 224 that includes text translations into one or more natural languages. The translation service 212 is configured to receive and respond to translation requests that it receives from translation requesting components associated with user computing devices, for instance, the translation requesting component 222 associated with the user computing device 210. In embodiments, the translation service 212 may employ machine translation services 226 to translate portions of electronic documents and/or search result captions.

A search result caption's original or source language is the natural language in which the electronic document (or associated search engine result caption or portion thereof) was authored. The target language (that is, the language into which translation is desired) is generally a natural language that differs from the document's source language. In embodiments, the target language is the user's native language, as it is defined in a user-language-preference setting of the search engine or the browser. The translation service 212 is configured to receive a selected search result caption or portion thereof in the original or source language of the caption/portion and to translate the selected caption/portion into the indicated target language to create a translated caption/portion and provide the translated caption/portion to the user computing device 210.

In embodiments of the present invention, translations of search result captions and/or portions thereof occur asynchronously. For instance, the translation service 212 may asynchronously employ a machine translation service (e.g., machine translation service 226) to translate text associated with a node of a Document Object Model (DOM) representing a search result caption or portion thereof. In some embodiments, the translation service 212 can employ asynchronous programming constructs or techniques, such as asynchronous JavaScript of XML ("AJAX"), "Web 2.0," or other asynchronous technology. A component, such as a client component associated with an Internet browser (e.g., the browser 220 of the user computing device 210) may asynchronously make a translation request (e.g., via the translation requesting component 222) to the translation service 212. The request can include one or more of the following: the URL of the document for which translation is requested, the text to be translated, the language of the presented search result caption/portion (i.e., the source or original language), the language into which the user desires the text to be translated (i.e., the target language), and so forth. The translation service 212 can then translate the text using a machine translation service (e.g., machine translation service 226) and/or a data store (e.g., data store 224). The translation service 212 can then provide the translated text to the user computing device 210, such as by invoking an AJAX callback function provided by the user computing device 210. The translation service 212 may then cause the browser to present the translated text in a window or floating panel proximate the text for which translation was requested.

Figure 3:
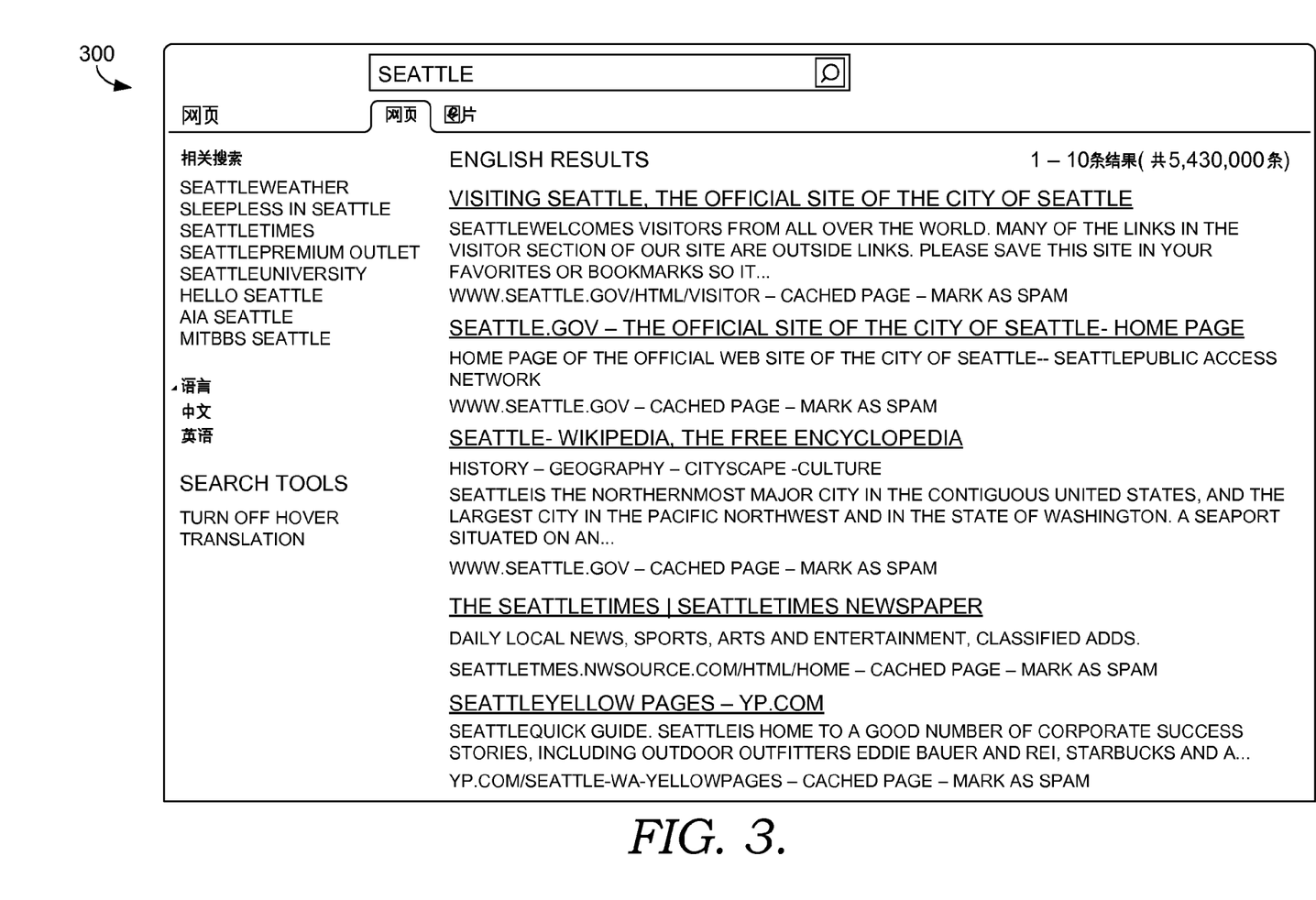
FIG. 3 is a screen shot of an exemplary user interface in accordance with embodiments of the present invention.

It will be understood and appreciated by those of ordinary skill in the art that no additional special-purpose translation program needs to be installed and/or invoked for a translation to be presented in accordance with embodiments hereof. Further, no additional action needs to be taken by the user, such as submitting the page to any form of translation engine. A graphical representation of a SERP 300 served by the search engine 214 is shown in FIG. 3. The page served by the search engine 214 appears by default without any translations as translations of search engine result captions and/or portions thereof are shown only when requested by the user via the particular user action. Otherwise the original search engine result caption (or portion thereof) is shown in the source language without the translations (see, FIG. 3).

This model enables the user to read the page in its original (source) language, and get an immediate translation for any word that appears in the page. It is believed that for a person who has some knowledge of the original language of the text, even if it is very limited, this method provides a more credible manner to fully use search results that are not in his or her native language. The model gives the user access to both the original and target language; thus in situations where the reader has some knowledge of the original language, he or she may use this knowledge to understand a major part of the search result captions, and consult translations only when needed.

With continued reference to FIG. 2, the search engine 214 may be any search engine capable of searching text and/or content. Those skilled in the art will recognize that the present invention may be implemented with any number of searching utilities. For example, an Internet search engine or a database search engine may utilize the present invention. These search engines are well known in the art, and commercially available engines share many similar processes.

The search engine 214 includes a receiving component 228, a search result determining component 230, an instruction attaching component 232, and a transmitting component 232. The receiving component 228 is configured to receive a query input by a user (for instance, utilizing the user computing device 210), the query requesting satisfying search results. Typically, the search query is received via a browser associated with the user computing device, for instance, the browser 220 associated with the user computing device 210.

The search results determining component 230 is configured to determine a plurality of search results satisfying the input search query. In embodiments, such satisfying search results are determined utilizing a data store (e.g., data store 216) configured to store indexed electronic documents. Techniques for determining search results that are determined to satisfy input search queries are well known to those of ordinary skill in the art and, accordingly, are not further described herein. Generally, the search results determining component 230 determines an HTML response that contains the search results that are determined to satisfy the search query.

The instruction attaching component 232 is configured to attach instructions (e.g., via an additional JavaScript) to the satisfying search results (that is, to the HTML response) before such results are transmitted to the browser 220 for rendering (via the transmitting component 234). The instructions attached to the search results are initialized immediately when the SERP is rendered in the user's browser and cause the browser to perform a number of actions with respect thereto. That is, the instructions appended or attached to the HTML response are configured to cause the browser to render a SERP having a plurality of search result captions associated therewith. Each search result caption includes a plurality of text elements, such as words, paragraphs, table cells, and the like. At least a portion of the text elements include an event (e.g., an onmouseover event) appended thereto that is configured to be triggered upon the browser detecting a particular user action (e.g., a user hover action) as more fully described below. The instructions are further configured to cause the browser to detect the particular user action with respect to one or more of the plurality of text elements and, in response to detecting the particular user action, request a translation of text associated with the text element in association with which the user action was detected. Still further, the instructions are configured to cause the browser to receive a translation of the text associated with the text element in association with which the particular user action was detected and to present the translation, for instance, in a floating panel or window proximate to the text associated with the text element.

The data repository 216 is configured to store information associated with search queries, search query results, user profiles and/or preferences, browser instructions, and the like. In various embodiments, such information may include, without limitation, indexed electronic documents, language-preference settings associated with a plurality of users, browser instructions associated with a plurality of potential user actions, and the like. In embodiments, the data repository 216 is configured to be searchable for one or more of the items stored in association therewith. It will be understood and appreciated by those of ordinary skill in the art that the information stored in association with the data repository 216 may be configurable and may include any information relevant to search queries, search query results, user profiles and/or preferences, browser instructions, and/or the like. The content and volume of such information are not intended to limit the scope of embodiments of the present invention in any way. Further, though illustrated as a single, independent component, the data repository 216 may, in fact, be a plurality of storage devices, for instance a database cluster, portions of which may reside in association with the search engine 214, the user computing device 210, another external computing device (not shown), and/or any combination thereof.

By way of example, FIGS. 3-6 are screen shots of exemplary user interfaces sequentially rendered in accordance with embodiments of the present invention. Suppose a user whose native language is Chinese, engages the Chinese version of a search engine and searches for the term "Seattle." FIG. 3 illustrates an exemplary SERP 300 that may be rendered. In reviewing the SERP 300, the user discovers a couple of words that he or she does not understand among the search result captions presented, the unclear words being presented in English and including "Pacific" and "outfitters." In accordance with embodiments of the present invention, the user hovers the mouse pointer over the first unclear word, "Pacific," and a translation of the English word is presented in Chinese in a float panel 410 proximate the hovered-over word. This is shown in the screen display 400 of FIG. 4.

Next, the user hovers the mouse pointer over the second unclear word, "outfitters," and a translation of the English word is presented in Chinese in a float panel 510 proximate the newly hovered-over word. This is shown in the screen display 500 of FIG. 5. Note that the float panel 410 previously associated with the English word "Pacific" is no longer presented as the user is no longer hovering the mouse pointer over this word.

In accordance with embodiments of the present invention, users may select phrases, sentences, paragraphs, or the like (that is, combinations of multiple words) and similarly receive floating-panel translations. This is shown in the screen display 600 of FIG. 6. In this instance, the user has selected (via highlighting and right-side mouse click, for example) the sentence "Daily local news, sports, arts and entertainment, classified ads." for translation. In response, a float panel 610 containing a translation of the entire selected sentence is presented.

Figure 7:
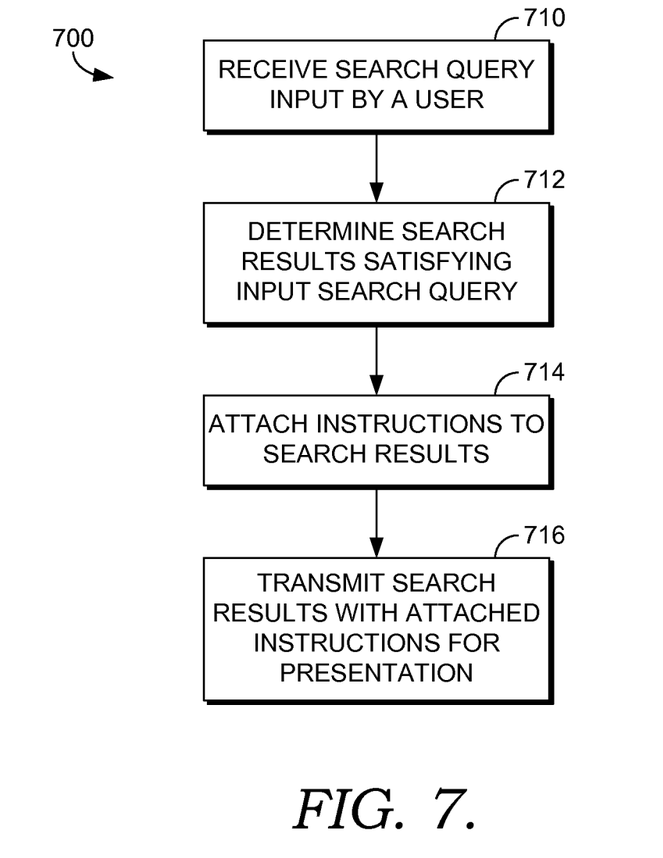
FIG. 7 is a flow diagram showing a method for enabling hover translation of a portion of a search engine results page (SERP), in accordance with an embodiment of the present invention.

Turning now to FIG. 7, a flow diagram is provided that illustrates a method 700 for enabling hover translation of a portion of a search engine results page, in accordance with an embodiment of the present invention. As indicated at block 710, a search query input by a user is received, for instance, by the receiving component 228 of the search engine 214 of FIG. 2. In embodiments, such search query is received via a browser (e.g., the browser 220 of FIG. 2) through a search engine interface, the search engine interface being rendered in a first natural language. One or more search results that satisfy the input search query are determined (e.g., utilizing the search results determining component 230 of the search engine 214 of FIG. 2), as indicated at block 712. Techniques for determining search results that are determined to satisfy input search queries are well known to those of ordinary skill in the art and, accordingly, are not further described herein. In embodiments, an HTML response containing search results satisfying the search query is determined.

As indicated at block 714, instructions are attached to the satisfying search results (e.g., utilizing the instruction attaching component 232 of the search engine 214 of FIG. 2). In embodiments wherein an HTML response containing search results satisfying the search query is determined, the instructions may be attached to the HTML response. In embodiments, the attached instructions are configured to cause the browser to perform a number of functions including, but not necessarily limited to, rendering a search engine results page having a plurality of search result captions, each search result caption having a plurality of text elements, at least a portion of which include an event appended thereto, the event being triggered by a particular user action; detecting the particular user action with respect to one of the plurality of text elements; in response to detecting the particular user action, requesting a translation of text associated with the one of the plurality of text elements; receiving a translation of text associated with the one of the plurality of text elements; and presenting the translation to the user. In embodiments, the instructions are configured to cause the browser to send an asynchronous request for the translation of the text associated with the one of the plurality of text elements, for instance, to a translation service (e.g., the translation service 212 of FIG. 2). In embodiments, the instructions are configured to indicate that presentation of the translation to the user is to be via a floating panel proximate to the text associated with the one of the plurality of text elements. As indicated at block 716, the search results with attached instructions are then transmitted for presentation, e.g., to the browser from which the search query was received. Such transmission may be, for instance, via the transmitting component 234 of the search engine 214 of FIG. 2.

Figure 8:
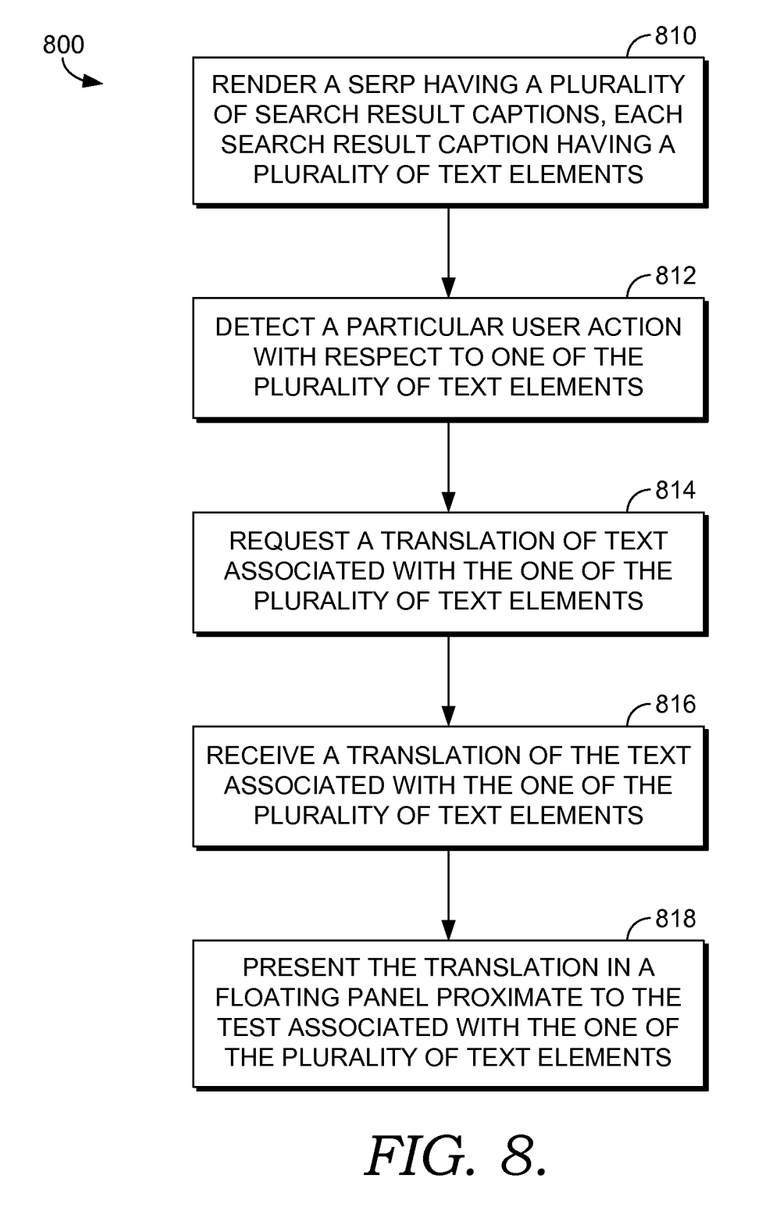
FIG. 8 is a flow diagram showing a method for enabling hover translation of a portion of a SERP in accordance with another embodiment of the present invention.

With reference to FIG. 8, a flow diagram is provided that illustrates a method 800 for enabling hover translation of a portion of a search engine results page (SERP), in accordance with an embodiment of the present invention. As indicated at block 810, a SERP having a plurality of search result captions, each search result caption having a plurality of text elements, is rendered. Generally, such SERP is rendered in response to receiving a user-input search query and determining a plurality of search results that satisfy the search query, each satisfying search result having one of the plurality of search result captions associated therewith. A particular user action, for instance, a mouse hover action, is then detected with respect to at least a portion of one of the plurality of text elements, as indicated at block 812. A translation of text associated with the one of the plurality of text elements for which the particular user action was detected is requested. This is indicated at block 814. As indicated at block 816, a translation of the text associated with the appropriate text element is received, and the translation is presented to the user, as indicated at block 818. In embodiments, such translation is presented in a floating panel proximate to the text associated with the appropriate text element, that is, the one of the plurality of text elements for which the particular user action was detected.

Figure 9:
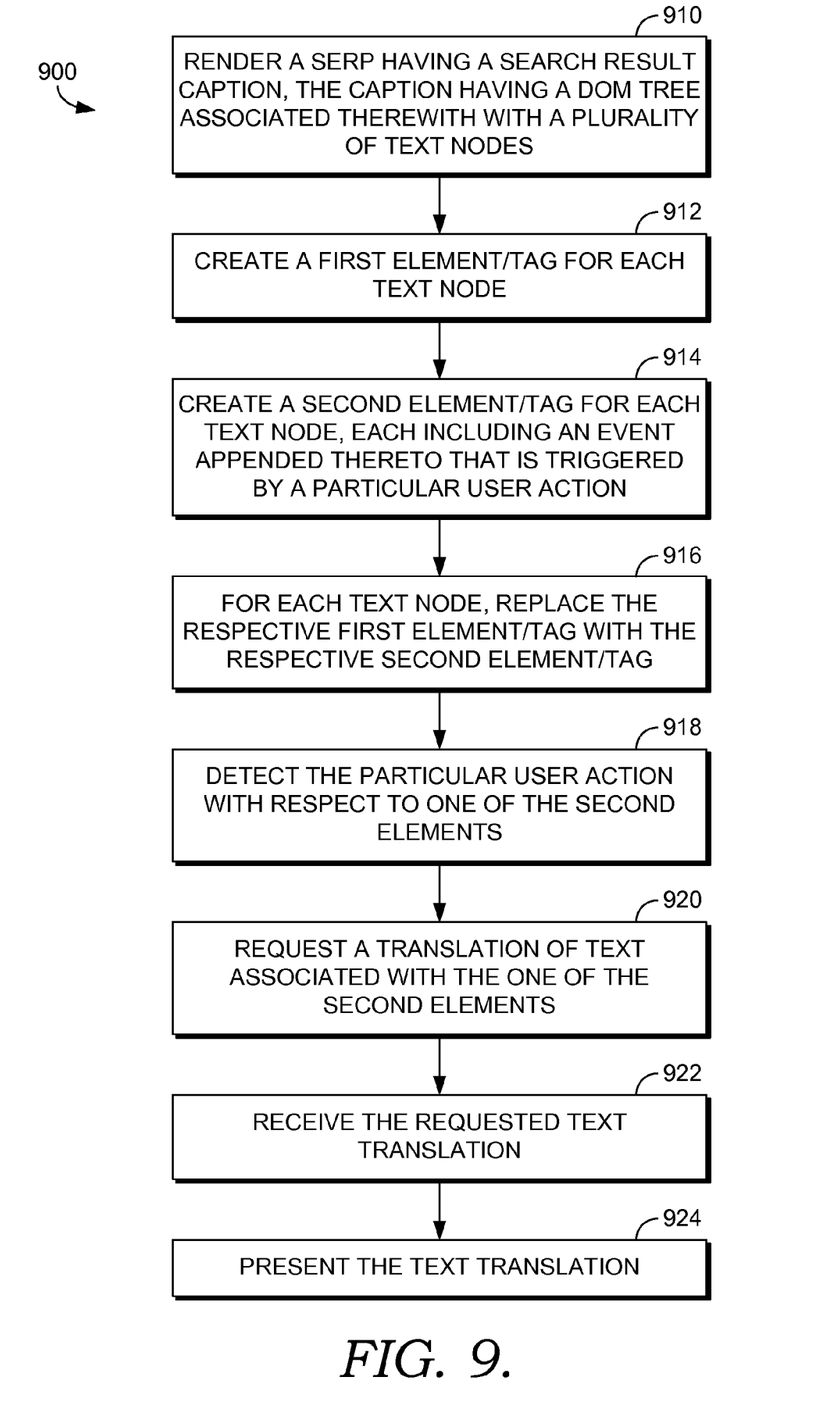
FIG. 9 is a flow diagram showing a method for enabling hover translation of a portion of a SERP in accordance with another embodiment of the present invention.

With reference to FIG. 9, a flow diagram is provided that illustrates a method 900 for enabling hover translation of a portion of a SERP, in accordance with an embodiment of the present invention. As indicated at block 910, a SERP is rendered. In embodiments, the SERP includes at least one search result caption, the caption having a document object model (DOM) tree associated therewith, the DOM tree having a plurality of text nodes. Generally, such SERP is rendered in response to receiving a user input search query and determining a plurality of search results that satisfy the search query, each satisfying search result having a search result caption associated therewith. As indicated at block 912, a respective first text element or tag associated with each text node is created. A respective second text element or tag is then created for each text node, each second element including an event appended thereto, the event being triggered by a particular user action. This is indicated at block 914. In embodiments, the event is an onmouseover event that is triggered by a mouse hover action. As indicated at block 916, for each text node, the respective first element is replaced with the respective second element.

As indicated at block 918, the particular user action is then detected with respect to one of the second elements. In response to detecting the particular user action, a translation of text associated with the appropriate second element is requested, as indicated at block 920. Upon receipt of the translation of text associated with the appropriate second element, as indicated at block 922, the translated text is presented, as indicated at block 924. In embodiments, such translation is presented in a floating panel proximate to the text associated with the appropriate second element, that is, the one of the second text elements for which the particular user action was detected.

As can be understood, embodiments of the present invention provide systems and methods for enabling hover translation of selected search engine result captions or portions thereof. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 700 of FIG. 7, the method 800 of FIG. 8, and the method 900 of FIG. 9 are not meant to limit the scope of the present invention in any way and, in fact, the steps may occur in a variety of different sequences within embodiments hereof. Any and all such variations, and any combination thereof, are contemplated to be within the scope of embodiments of the present invention.

One or more portions of the static image may be associated with a streaming video file. Oftentimes, high-quality and/or high-resolution images and video files are too large for efficient and timely transmission over the Internet. However, it is desirable that the images/videos be able to load rapidly so as to provide user functionality as quickly as possible. As such, it may be desirable to optimize the images and/or video files, for instance, via compression techniques and/or resolution-altering techniques. In embodiments of the present invention, a frame of a streaming video file that has been optimized is transmitted as at least a portion of the static image.

The transmitting component 226 is further configured to transmit streaming video files for presentation as at least a portion of the background for search engine home pages. In embodiments, such transmission takes place in a video format determined to be acceptable by the requesting client computing device. In embodiments, such streaming video files may be optimized (e.g., utilizing compression and/or resolution-altering techniques) prior to transmission.

The initiating component 228 is configured to initiate play of a streaming video file that is transmitted by the transmitting component 226. In embodiments, such initiation takes place automatically without user action. It will be understood and appreciated by those of ordinary skill in the art that user-initiation of play of streaming video file content is also contemplated to be within the scope of embodiments of the present invention. After a predetermined amount of time, the streaming video file replaces the static image (for instance, the optimized frame of the streaming video file) as at least a portion of the background for the search engine home page. In embodiments, the predetermined amount of time corresponds to one or more of a time period for transmitting the video file and a predetermined period of user inactivity with respect to the search engine home page subsequent to transmitting the image for presentation.

In one embodiment, play is initiated sequentially through the frames of the streaming video file beginning with the frame that is transmitted as the static image. In this way, play initiation begins seamlessly for the user—simply picking up from where the image already is. In another embodiment, a transition takes place between the static image and the streaming video file, for instance, a fade out/fade in transition, or the like. Any and all such variations, and any combination thereof, are contemplated to be within the scope of embodiments of the present invention.

Turning now to FIG. 3, a flow diagram is provided that illustrates an exemplary method 300 for presenting streaming video as a background for a search engine home page, in accordance with an embodiment of the present invention. Initially, as indicated at block 310, a request for presentation of a search engine home page is received, for instance, from client device 210 of FIG. 2. As indicated at block 312, an image is transmitted (e.g., from the search server 212 of FIG. 2) for presentation as at least a portion of the background for the search engine home page (for instance, in association with the display 218 of the client device 210 of FIG. 2). Also transmitted is a streaming video file, as indicated at block 314. In embodiments, at least a portion of the transmitted image represents an optimized frame of the streaming video file. After a predetermined amount of time (e.g., after a predetermined period of user inactivity with respect to the displayed search engine home page), play of the streaming video file is automatically initiated without user action, as indicated at block 316. The streaming video file replaces the at least a portion of the image as the background for the search engine home page (for instance, in association with the display 218 of the client device 210 of FIG. 2).

Figure 4:
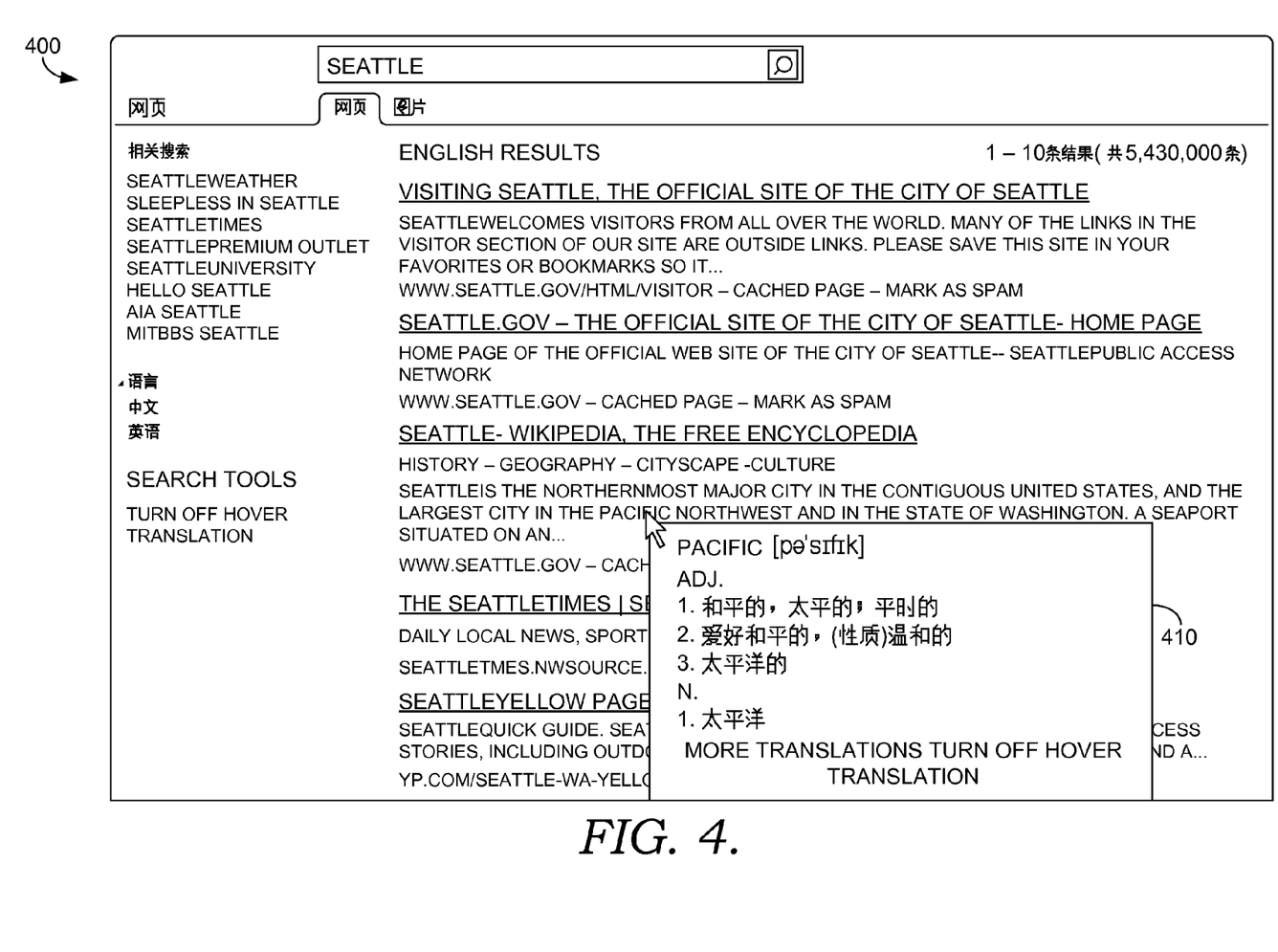
FIG. 4 is a screen shot of an exemplary user interface in accordance with embodiments of the present invention.
Figure 5:
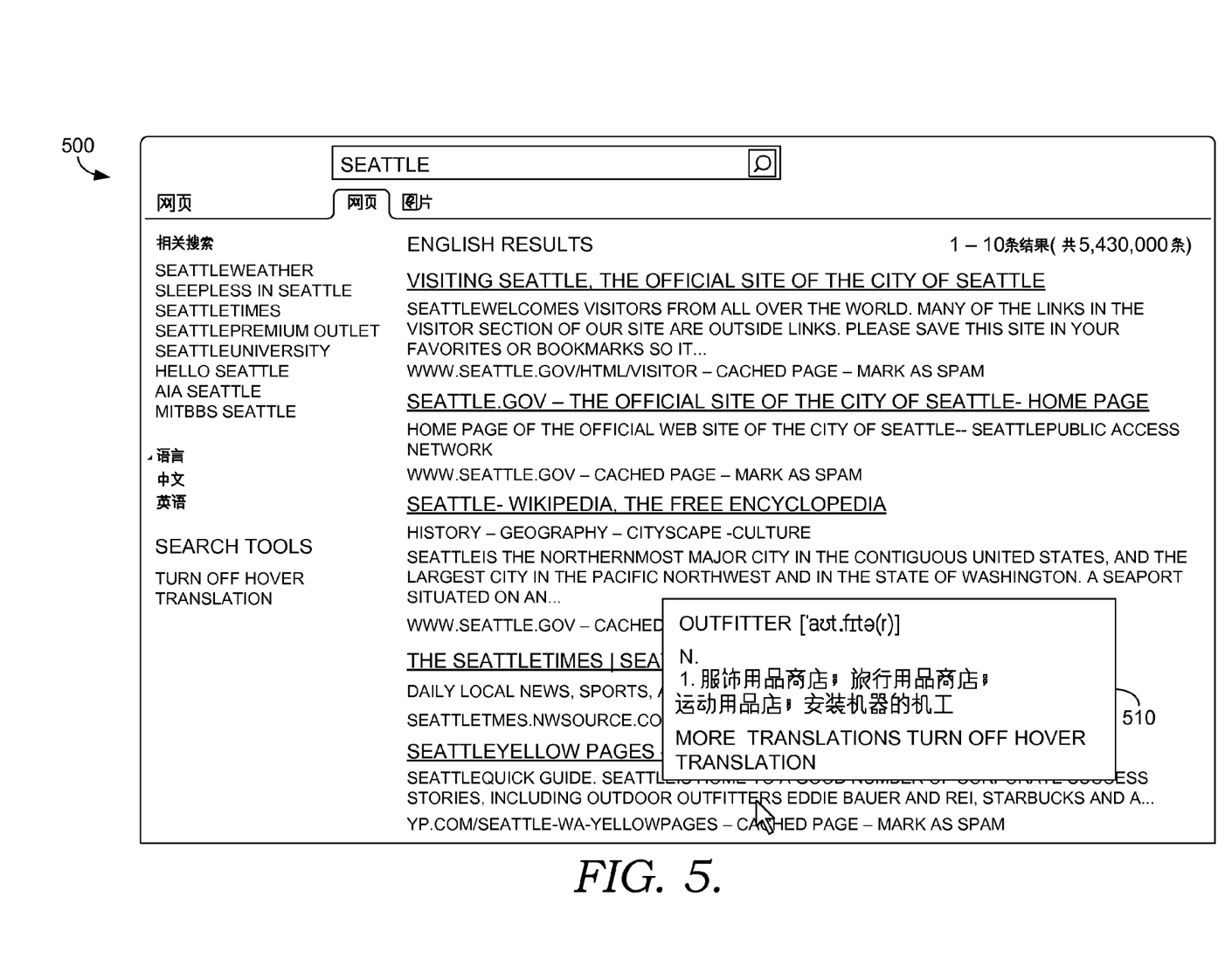
FIG. 5 is a screen shot of an exemplary user interface in accordance with embodiments of the present invention.
Figure 6:
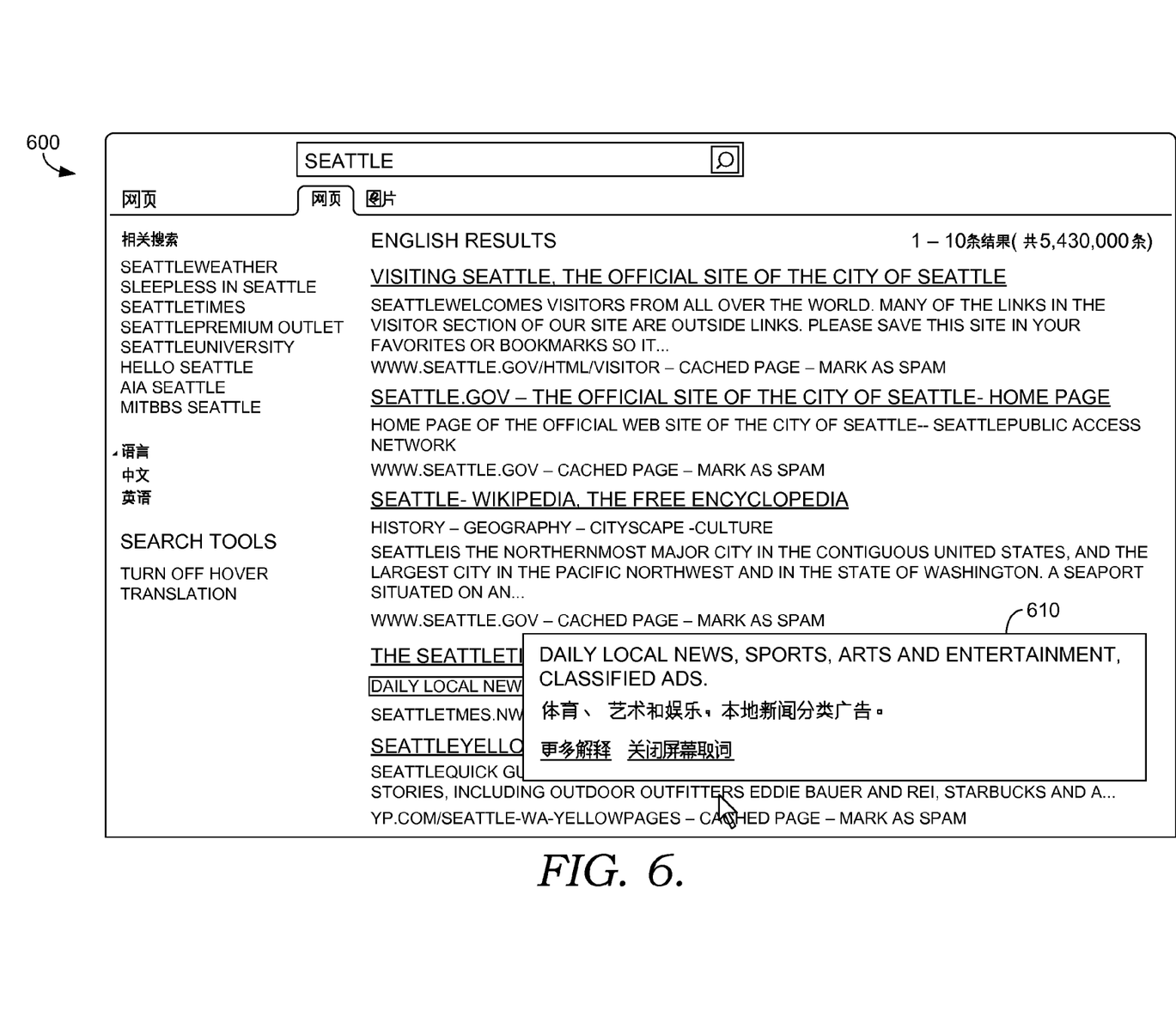
FIG. 6 is a screen shot of an exemplary user interface in accordance with embodiments of the present invention.

With reference to FIG. 4, a flow diagram is provided that illustrates another exemplary method 400 for presenting streaming video as a background for a search engine home page, in accordance with an embodiment of the present invention. Initially, as indicated at block 410, a request for presentation of a search engine home page is received from a client device, for instance, from the client device 210 of FIG. 2. As indicated at block 412, it is determined whether the requesting client device is capable of presenting streaming video as at least a portion of the background for the search engine home page. If it is determined that the requesting client device is not capable of presenting streaming video as at least a portion of the background for the search engine home page, a static image is transmitted for presentation as the background of the search engine home page, as indicated at block 414. The static image may or may not be associated with a frame of a streaming video file.

As indicated at block 416, it is also determined whether the requesting client device is associated with any applicable preference settings that either permit or hinder presentation of streaming video as at least a portion of the background for the search engine home page. If it is determined that the client device is associated with any preference settings that do not permit or otherwise hinder presentation of a streaming video file as at least a portion of the background for a search engine home page, a static image is transmitted for presentation as at least a portion of the background of the search engine home page, as indicated at block 414. Again, the static image may or may not be associated with a frame of a streaming video file.

If it is determined at block 412 that the requesting client device is capable of presenting streaming video as at least a portion of the background for the search engine home page and it is determined at block 414 that any applicable preference settings permit and do not otherwise hinder presentation of streaming video as at least a portion of the background for a search engine home page, a displayable frame of a streaming video file is transmitted (e.g., from the search server 212 of FIG. 2) to the requesting device for presentation as at least a portion of the background of the search engine home page (for instance, in association with the display 218 of the client device 210 of FIG. 2). This is indicated at block 418. In embodiments, the displayable frame is the initial frame of the streaming video file. In other embodiments, the displayable frame is not the initial frame but is another frame of the streaming video file that is rich and relevant to the content of the streaming video file.

After a predetermined period, for instance, after a predetermined period of user inactivity with respect to the search engine home page, at least a portion of the static image corresponding to the displayable frame of the streaming video file is transitioned into a plurality of sequentially-arranged frames of the streaming video file as the at least a portion of the background of the search engine home page. This is indicated at block 422. Thus, the streaming video file replaces the displayable frame as the at least a portion of the background for the search engine home page (for instance, in association with the display 218 of the client device 210 of FIG. 2). In embodiments, transitioning the at least a portion of the static image corresponding to the displayable frame of the streaming video file as the at least a portion of the background of the search engine home page is seamless and begins with the displayable frame. In other embodiments, a transition (e.g., a fade-in/fade-out transition) is initiated. Any and all such variations, and any combination thereof, are contemplated to be within the scope of embodiments of the present invention.

As can be understood, embodiments of the present invention provide systems and methods for presenting streaming video as at least a portion of the background for a search engine home page. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3 and the method 400 of FIG. 4 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage devices storing computer-useable instructions that, when used by one or more computing devices, cause the one or more computing devices to perform a method for enabling hover translation of a portion of a search engine results page, the method comprising:
   receiving a search query input by a user, the search query being received via a browser; and
   attaching instructions to a plurality of search results determined to satisfy the query, the instructions causing the browser to:
      render the search engine results page having a plurality of search result captions, each search result caption having a plurality of text elements, at least a portion of which include an event appended thereto, the event being triggered by a particular user action;
      detect the particular user action with respect to one of the plurality of text elements;
      in response to detecting the particular user action, request a translation of text associated with the one of the plurality of text elements;
      receive a translation of the text associated with the one of the plurality of text elements; and
      present the translation in a floating panel proximate to the text associated with the one of the plurality of text elements;
   wherein the particular user action that triggers the event includes hovering or clicking a pointer, hovering or touching with an electronic pen, hovering or touching with a finger, or a vocal command.

2. The one or more computer-readable storage devices of claim 1, wherein receiving the search query input by the user comprises receiving the search query via a search engine interface, the search engine interface being rendered in a first natural language.

3. The one or more computer-readable storage devices of claim 2, wherein the translation of the text associated with the one of the plurality of text elements is at least partially in a second natural language different from the first natural language.

4. The one or more computer-readable storage devices of claim 3, wherein the translation presented in the floating panel is in the first natural language.

5. The one or more computer-readable storage media of claim 1, wherein the translation presented in the floating panel is in a natural language specified in a user-preference setting.

6. The one or more computer-readable storage devices of claim 1, wherein the event appended to at least the portion of the text elements is an onmouseover event, and wherein the particular user action that triggers the event further comprises at least one of hovering, clicking, or touching proximate to the one of the plurality of text elements.

7. The one or more computer-readable storage devices of claim 1,
   wherein causing the browser to detect the particular user action with respect to one of the plurality of text elements comprises causing the browser to detect the particular user action with respect to multiple adjacent text elements of the plurality of text elements,
   wherein causing the browser, in response to the particular user action, to send a request for a translation of text associated with the one of the plurality of text elements to the server comprises, causing the browser, in response to the particular user action, to send a request for a translation of text associated with each of the multiple adjacent text elements,
   wherein causing the browser to receive a translation of the text associated with the one of the plurality of text elements from the server comprises causing the browser to receive a translation of the text associated with each of the multiple adjacent text elements,
   and wherein causing the browser to present the translation in a floating panel proximate to the text associated with the one of the plurality of text elements comprises causing the browser to present the translation in a floating panel proximate to the text associated with the multiple adjacent text elements.

8. The one or more computer-readable storage devices of claim 1, wherein causing the browser to request a translation of text associated with the one of the plurality of text elements comprises causing the browser to send an asynchronous request for the translation of text associated with the one of the plurality of text elements.

9. A hover-translation system for search engine results pages, comprising:
   a computing device associated with one or more processors and one or more computer-readable storage media;
   a data store coupled with the computing device; and
   a search engine that receives a query input by a user, the search query being received via a browser, determines an HTML response containing search results satisfying the search query, and attaches instructions to the HTML response, the instructions causing the browser to:
      render a search engine results page having a plurality of search result captions, each search result caption having a plurality of text elements, at least a portion of which include an event appended thereto, the event being triggered by a particular user action;
      detect the particular user action with respect to one of the plurality of text elements;
      in response to detecting the particular user action, request a translation of text associated with the one of the plurality of text elements;

receive a translation of the text associated with the one of the plurality of text elements; and present the translation in a floating panel proximate to the text associated with the one of the plurality of text elements;

wherein the particular user action that triggers the event includes hovering or clicking a pointer, hovering or touching with an electronic pen, hovering or touching with a finger, or a vocal command.

10. The hover-translation system of claim 9, wherein receiving the search query input by the user comprises receiving the search query via a search engine interface, the search engine interface being rendered in a first natural language.

11. The hover-translation system of claim 10, wherein the translation of the text associated with the one of the plurality of text elements is at least partially in a second natural language different from the first natural language.

12. The hover-translation system of claim 11, wherein the translation presented in the floating panel is in the first natural language.

13. The hover-translation system of claim 9, wherein the translation presented in the floating panel is in a natural language specified in a user-preference setting.

14. The hover-translation system of claim 9, wherein the event appended to at least the portion of the text elements is an onmouseover event, and wherein the particular user action that triggers the event further comprises at least one of hovering, clicking, or touching proximate to the one of the plurality of text elements.

15. One or more computer-readable storage devices storing computer-useable instructions that, when used by one or more computing devices, cause the one or more computing devices to perform a method for enabling hover translation of a portion of a search engine results page, the method comprising:

receiving a search query input by a user; and attaching instructions to a plurality of search results determined to satisfy the query, the instructions causing the browser to:

render the search engine results page having at least one search result caption, the at least one search result caption having a document object model (DOM) tree associated therewith, the DOM tree having a plurality of text nodes;

create a respective first element associated with each text node;

create a respective second element associated with each text node, each second element including an event appended thereto, the event being triggered by a particular user action;

for each text node, replace the respective first element with the respective second element;

detect the particular user action with respect to one of the second elements;

in response to detecting the particular user action, request a translation of text associated with the one of the second elements;

receive a translation of the text associated with the one of the second elements; and present the translation in a floating panel proximate to the text associated with the one of the plurality of text elements.

16. The one or more computer-readable storage devices of claim 15, wherein receiving the search query input by the user comprises receiving the search query via a search engine interface, the search engine interface being rendered in a first natural language.

17. The one or more computer-readable storage devices of claim 16, wherein the translation of the text associated with the one of the plurality of second elements is at least partially in a second natural language different from the first natural language.

18. The one or more computer-readable storage devices of claim 17, wherein the translation presented in the floating panel is in the first natural language.

19. The one or more computer-readable storage devices of claim 15, wherein the translation presented in the floating panel is in a natural language specified in a user-preference setting.

20. The one or more computer-readable storage devices of claim 15, wherein the event appended to the one of the second text elements is an onmouseover event, and wherein the particular user action that triggers the event is a mouse hover action.

* * * * *